(12) United States Patent
Kim et al.

(10) Patent No.: US 12,323,374 B2
(45) Date of Patent: Jun. 3, 2025

(54) METHOD AND APPARATUS FOR MESSAGING SERVICE

(71) Applicant: KAKAO CORP., Jeju-si (KR)

(72) Inventors: Eun Hye Kim, Seongnam-si (KR); Han Wool Cha, Seongnam-si (KR); Seok Gyu Lee, Seongnam-si (KR); Sul Gi Kim, Seongnam-si (KR); In Hae Choi, Seongnam-si (KR); Tae Jun Choi, Seongnam-si (KR); Dae Nyeon Kim, Seongnam-si (KR)

(73) Assignee: KAKAO CORP., Jeju-Si (KR)

( * ) Notice: Subject to any disclaimer, the term of this patent is extended or adjusted under 35 U.S.C. 154(b) by 0 days.

(21) Appl. No.: 18/318,601

(22) Filed: May 16, 2023

(65) Prior Publication Data

US 2023/0370403 A1    Nov. 16, 2023

(30) Foreign Application Priority Data

May 16, 2022   (KR) .................. 10-2022-0059840

(51) Int. Cl.
*H04L 51/046*    (2022.01)
*G06F 3/0482*    (2013.01)
*H04L 51/52*     (2022.01)

(52) U.S. Cl.
CPC .......... *H04L 51/046* (2013.01); *G06F 3/0482* (2013.01); *H04L 51/52* (2022.05)

(58) Field of Classification Search
CPC ....... H04L 51/046; H04L 51/52; H04L 51/04; H04L 51/02; H04L 1/189; H04L 9/32; H04L 12/4015; H04L 12/40163; H04L 41/026; H04L 51/00; H04L 51/21; H04L 61/4555; H04L 63/0227; H04L 65/00; G06F 3/0482; G06Q 50/30; H04N 1/32358; H04N 1/3208

See application file for complete search history.

(56) References Cited

U.S. PATENT DOCUMENTS

| | | | |
|---|---|---|---|
| 7,761,591 B2 * | 7/2010 | Graham | G06Q 40/02 709/227 |
| 10,170,123 B2 * | 1/2019 | Orr | G10L 17/22 |
| 10,497,361 B1 * | 12/2019 | Rule | G10L 25/48 |
| 11,605,387 B1 * | 3/2023 | Muralitharan | G10L 15/22 |
| 12,126,544 B2 * | 10/2024 | Palamadai | H04L 67/52 |

(Continued)

FOREIGN PATENT DOCUMENTS

| | | |
|---|---|---|
| KR | 10-2013-0073101 A | 7/2013 |
| KR | 10-20160010523 A | 1/2016 |
| KR | 10-20180041372 A | 4/2018 |

OTHER PUBLICATIONS

Apr. 15, 2024—(KR) Korean Office Action—App No. 10-2022-0059840.

(Continued)

*Primary Examiner* — Michael Won
(74) *Attorney, Agent, or Firm* — Banner & Witcoff, Ltd.

(57) ABSTRACT

A method and apparatus for a messaging service are provided. An operating method of a terminal on which an application for a messaging service is installed includes switching an input mode of a chat interface to an assistant mode to call an assistant function, receiving a call for the assistant function, and displaying an assistant interface corresponding to the called assistant function.

20 Claims, 15 Drawing Sheets

(56) References Cited

U.S. PATENT DOCUMENTS

| | | | | |
|---|---|---|---|---|
| 2004/0049539 | A1* | 3/2004 | Reynolds | H04L 12/1822 709/205 |
| 2005/0055306 | A1* | 3/2005 | Miller | G06Q 40/04 705/37 |
| 2006/0063552 | A1* | 3/2006 | Tillet | H04M 3/56 455/507 |
| 2006/0242574 | A1* | 10/2006 | Richardson | G06F 16/957 707/E17.119 |
| 2007/0037599 | A1* | 2/2007 | Tillet | H04L 12/1813 455/521 |
| 2008/0091692 | A1* | 4/2008 | Keith | G06F 16/958 |
| 2008/0222295 | A1* | 9/2008 | Robinson | G06F 16/954 709/227 |
| 2009/0132714 | A1* | 5/2009 | Blander | H04L 69/40 709/227 |
| 2010/0057857 | A1* | 3/2010 | Szeto | H04L 51/04 709/206 |
| 2011/0219320 | A1* | 9/2011 | Majumder | G06F 3/048 707/E17.03 |
| 2013/0275138 | A1* | 10/2013 | Gruber | G10L 13/00 704/260 |
| 2013/0275875 | A1* | 10/2013 | Gruber | G06F 3/167 715/728 |
| 2014/0340712 | A1* | 11/2014 | Hoes | G06F 3/126 358/1.15 |
| 2016/0070581 | A1* | 3/2016 | Soon-Shiong | G06F 9/453 715/705 |
| 2016/0110322 | A1* | 4/2016 | Miller | G06F 3/0481 715/758 |
| 2016/0173575 | A1* | 6/2016 | Vaswani | H04L 67/01 709/203 |
| 2016/0380931 | A1* | 12/2016 | Sircar | H04L 51/224 709/206 |
| 2018/0367483 | A1* | 12/2018 | Rodriguez | H04L 51/046 |
| 2020/0194000 | A1* | 6/2020 | Xian | G10L 15/26 |
| 2021/0044640 | A1* | 2/2021 | He | G10L 15/26 |
| 2021/0247882 | A1* | 8/2021 | Norman | G06F 3/0484 |
| 2023/0359670 | A1* | 11/2023 | Chaudhry | G06F 16/90332 |
| 2023/0376635 | A1* | 11/2023 | Kim | G06F 3/0481 |

OTHER PUBLICATIONS

Jun. 4, 2024—(JP) Japanese Office Action—App No. 2023-081060. Enables group schedule management and schedule adjustment—Calendar-linked LINE Bot system—machine translated by Google.

* cited by examiner

620

| | | |
|---|---|---|
| < | Briefing board | |
| Schedule | To-do | Reserved message |

To-do 6 ∧

○ Solve previous mock tests
   End date  Thursday, November 18
   Repeat Everyday ○ Solve one math workbook ○ Make wrong answer notes for all subjects
   End date  Wednesday, September 10

○ 2021 national college entrance exam
   End date  Thursday, November 18
   Repeat  Everyday

•
•
•

Done 2 ∧

○ ~~Check wrong answers of English test~~

○ ~~Solve math workbook~~

[ Register to-do ]

FIG. 6B

METHOD AND APPARATUS FOR MESSAGING SERVICE

CROSS-REFERENCE TO RELATED APPLICATION(S)

This application claims the priority benefit of Korean Patent Application No. 10-2022-0059840 filed on May 16, 2022, in the Korean Intellectual Property Office, the disclosure of which is incorporated herein by reference for all purposes.

BACKGROUND

Technical Field

One or more embodiments relate to a method and apparatus for a messaging service. More specifically, the embodiments relate to a terminal on which an application for the messaging service is installed and a server providing an assistant function linked with the application for the messaging service.

Description of the Related Art

Recently, with the development of mobile smart devices, the use of an online platform service to communicate with other users via network has increased. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

The increase in communication via mobile devices has further allowed the online platform services to support functions for sharing various types of data and assisting communication in addition to a function for users to have one-on-one communication with other users by text.

BRIEF SUMMARY

An aspect provides a messenger application configured to perform an assistant function to assist a user's life, such as the user's scheduling, besides a message transmission and reception function.

Another aspect also provides an interfacing method to efficiently provide a messaging function and an assistant function through an area of a limited size, such as a display of a portable terminal.

However, technical aspects are not limited to the foregoing aspects, and there may be other technical aspects.

According to an aspect, an operating method of a terminal on which an application for a messaging service is installed includes, in response to a request to execute an assistant mode that is received through a chat interface of the application, identifying a type of a chatroom in which the request to execute the assistant mode is generated; switching an input mode of the chat interface to the assistant mode for a call for an assistant function based on the identified type of the chatroom; receiving the call for the assistant function through the chat interface switched to the assistant mode; and displaying an assistant interface corresponding to the called assistant function through a partial area in the chat interface.

The assistant function may include at least one of a search function, a scheduling function through a chatroom, a to-do management function, and a reserved message management function.

The switching to the assistant mode may include at least one of displaying a search box linked with a search server on the chat interface and changing a message input box of the chat interface to the search box.

The switching to the assistant mode may further include displaying an assistant function menu including at least one interfacing object for calling the assistant function on the chat interface.

The switching to the assistant mode may further include displaying an interfacing object for calling an assistant function activated in the assistant mode based on the type of the chatroom in which the request to execute the assistant mode is generated.

The displaying the assistant interface corresponding to the called assistant function may include displaying the assistant interface including information on the chatroom based on the type of the chatroom in which the request to execute the assistant mode is generated.

The assistant interface may be displayed by replacing a message input box of the chat interface.

The operating method of the terminal may further include removing a display of the assistant interface and displaying a message input box in response to an input mode of the chat interface switching to a chat mode for a message input.

The operating method of the terminal may further include receiving a service corresponding to the called assistant function through the assistant interface.

The receiving the service corresponding to the called assistant function may include receiving a service linked with the chatroom in which the request to execute the assistant mode is generated based on the called assistant function.

According to another aspect, a terminal on which an application for a messaging service is installed includes a processor configured to, in response to a request to execute an assistant mode that is received through a chat interface of the application, identify a type of a chatroom in which the request to execute the assistant mode is generated, switch an input mode of the chat interface to the assistant mode for a call for an assistant function based on the identified type of the chatroom, receive the call for the assistant function through the chat interface switched to the assistant mode, and display an assistant interface corresponding to the called assistant function through a partial area in the chat interface.

The assistant function may include at least one of a search function, a scheduling function through a chatroom, a to-do management function, and a reserved message management function.

The processor, when switching to the assistant mode, may perform at least one of displaying a search box linked with a search server on the chat interface and changing a message input box of the chat interface to the search box.

The processor, when switching to the assistant mode, may display an assistant function menu including at least one interfacing object for calling the assistant function on the chat interface.

The processor, when switching to the assistant mode, may display an interfacing object for calling an assistant function activated in the assistant mode based on the type of the chatroom in which the request to execute the assistant mode is generated.

The assistant interface may be displayed by replacing a message input box of the chat interface.

The processor may remove a display of the assistant interface and display a message input box in response to an input mode of the chat interface switching to a chat mode for a message input.

The processor may receive a service corresponding to the called assistant function through the assistant interface.

The processor, when receiving the service corresponding to the call for the assistant function may receive a service linked with the chatroom in which the request to execute the assistant mode is generated based on the called assistant function.

Additional aspects of example embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the present disclosure will become apparent and more readily appreciated from the following description of example embodiments, taken in conjunction with the accompanying drawings of which:

FIGS. 6A and 6B are diagrams illustrating a screen of a to-do management interface according to an embodiment;

DETAILED DESCRIPTION

Figure 1:
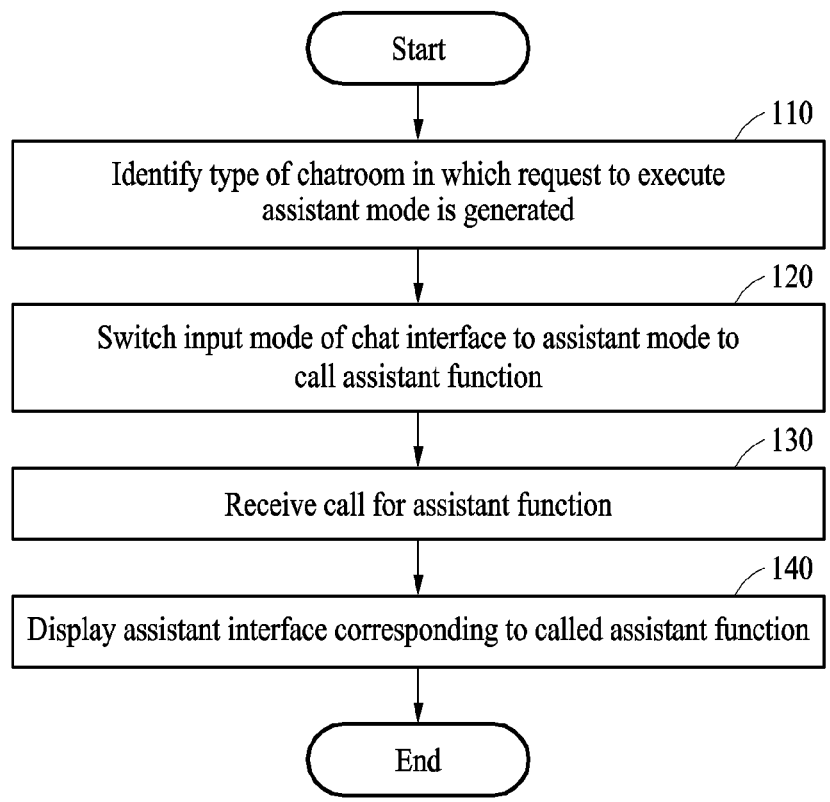
FIG. 1 is a flowchart illustrating an operation of a terminal on which an application for a messaging service is installed, according to an embodiment.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a flowchart illustrating an operation of a terminal on which an application for a messaging service is installed, according to an embodiment.

Referring to FIG. 1, an operating method of a terminal on which an application for a messaging service is installed includes operation 110 of identifying a type of a chatroom in which a request to execute an assistant mode is generated, operation 120 of switching an input mode of a chat interface to an assistant mode to call the assistant function, operation 130 of receiving a call for the assistant function, and operation 140 of displaying an assistant interface corresponding to the called assistant function.

The terminal may be one of electronic apparatuses, such as a computer, a portable computer, a wireless phone, a mobile phone, a smartphone, a personalized digital assistant (PDA), a web tablet, and a wearable device, and may refer to any apparatus that may install and execute an application. The terminal may receive a service and/or content provided by a server through the application. For example, under the control of the application, the terminal may perform overall service operations, such as service screen setting, data input, data transmission and reception, and data storage. For example, the terminal may process a user interface or user interaction through a processor and output a processing result through an output device of the terminal or transmit the processing result to the server.

According to an embodiment, the application installed on the terminal may include an application for a messaging service or a messenger application. The terminal may be provided with the messaging service through the messenger application. The messaging service may be a service for receiving a message from users subscribing to the service or transmitting a message to the users and for transmitting a notification message to the subscribing users and may include, for example, an instant messaging service based on an instant message.

According to an embodiment, the messaging server may receive a message from the users subscribing to the messaging service or transmitting a message to the users and may provide the messaging service for transmitting a notification message to the subscribing users. The messaging server may generate a user account for the messaging service in response to a messaging service subscription request from a user. The user account may be a unit for identifying the user subscribing to the service by the messaging server. A terminal logging in to the user account may use the messaging service provided by the messaging server. Hereinafter, the terminal may refer to the terminal logging in to the user account that is generated by subscribing to the messaging service.

According to an embodiment, the messaging service may be provided to the terminal through the chat interface. The chat interface may be an interface for a message transmission and reception function provided by the messaging service and may include, for example, an interface that provides a function for transmitting a message through a chatroom in which at least one user account participates and for displaying a received message. The chat interface may correspond to a chatroom which is a virtual space in which at least one user account participates and a chat between users takes place.

For example, the chat interface may include an interfacing object that supports a function of transmitting and receiving a message through a chatroom. The interfacing object may be an object implemented to perform a specific function through interaction with a user and may include, for example, a button, an input field, a switch, and the like. An example of the chat interface may include a screen 310 illustrated in FIG. 2. For example, referring to FIG. 2, the chat interface may include the interfacing object that supports a function related to the messaging service, such as a chatroom 311 through which transmitted and received messages are displayed, an input window 312 to which text to be transmitted as a message is input, and/or buttons 313, 314, and 315 through which a specific function or service is requested.

According to an embodiment, in operation 110, the terminal may identify the type of the chatroom in which the request to execute the assistant mode is generated when the request to execute the assistant mode is received through the chat interface of the application.

According to an embodiment, the assistant mode may be the type of an input mode of the chat interface and the input mode to call the assistant function. The assistant function may be a function provided to improve the convenience of a user, besides the function of transmitting and receiving a message in the messenger application, and may include, for example, at least one of a search function through a chatroom, a scheduling function, a to-do management function, and a reserved message management function. For example, the assistant function may include the search function through a chatroom together with at least one of the scheduling function, the to-do management function, and the reserved message management function. The scheduling function may be a function for registering an item for which a specific period is designated in a calendar under a user account and retrieving a registered schedule by dates. The to-do management function may be a function for registering items to be done for a specific period and checking whether the items are done through a to-do list corresponding to the specific period. The reserved message management function may be a function for transmitting a pre-written message to a predetermined target at a predetermined time by request from a user. The assistant function may be provided by the messaging server or a separate server linked with the messaging server. For example, different servers may provide different assistant functions. The assistant function is described in detail below.

According to an embodiment, based on the input mode of the chat interface, the type of an input to be received through the chat interface and/or a method of processing the input may be determined. For example, the input mode of the chat interface may include a chat mode and an assistant mode. The chat mode may be the input mode to input a message to be transmitted to a chatroom participant. For example, the chat interface corresponding to the chat mode may receive a text input through the message input box, and input text may be transmitted as a message. The assistant mode may be the input mode to call the assistant function. For example, the chat interface corresponding to the assistant mode may receive an input of a search word through the search box. In response to the input of the search word through the search box, the search function through a chatroom may be called. As another example, the chat interface corresponding to the assistant mode may receive an input of calling at least one of the scheduling function, the to-do management function, and the reserved message management function through an assistant function menu.

According to an embodiment, the chat interface may be set to any one type of input mode. For example, when the request to execute the assistant mode is received through the chat interface to which the input mode is not set, the input mode of the chat interface may be determined to be the assistant mode. The input mode set for the chat interface may be switched to another type of input mode. For example, when the request to execute the assistant mode is received through the chat interface in a mode (e.g., the chat mode) different from the assistant mode, the input mode of the chat interface may be switched from the mode (e.g., the chat mode) different from the assistant mode to the assistant mode.

According to an embodiment, in response to the received request to execute the assistant mode, in operation 110, the terminal may identify the type of the chatroom in which the request to execute the assistant mode is generated. For example, based on an identifier of the chatroom in which the request to execute the assistant mode is generated, the type of the chatroom may be determined.

According to an embodiment, the type of the chatroom may be determined based on at least one of the number of user accounts included by the chatroom and a method of participating in the chatroom. For example, the type of the chatroom may include a chatroom with yourself that does not include another user account, a 1:1 chatroom that includes another user account, and a group chatroom that includes two or more other user accounts. As another example, the type of the chatroom may include a general chatroom and an anonymous chatroom. The general chatroom may be a chatroom generated by designating other user account(s), of which account information is registered in the messenger application, as a participant of the chatroom. A user of the messenger application may register identification information on a user account, such as a phone number and an identification (ID), as the account information of a user in a friend relationship. The general chatroom may be a chatroom including other user account(s), of which the account information is registered in the messenger application, or registered as a friend, as a participant. The anonymous chatroom may be a chatroom in which user account(s) may participate through link information regardless of being a friend or not in the messenger application. For example, an anonymous chatroom service may include an open chat service (a registered trademark of Kakao Corp.) provided by Kakao, that is, the applicant of the present disclosure, and more specifically, a non-acquaintance-based open chat service provided by a KakaoTalk application of the applicant of the present disclosure. The anonymous chatroom may be a chatroom of the open chat service provided by Kakao, that is, the applicant of the present disclosure. The open chat service provided by Kakao is an example of an anonymous chatroom service, and examples are not limited thereto. The anonymous chatroom service may include a service providing a chatroom in which a user participates by using a temporary profile, not a real-name-based account.

According to an embodiment, based on the identified type of the chatroom, in operation 120, the terminal may switch the input mode of the chat interface to the assistant mode to call the assistant function.

According to an embodiment, operation 120 may include an operation of adding an interfacing object corresponding to the assistant mode to the chat interface. For example, operation 110 of switching to the assistant mode may include at least one of displaying the search box linked with a search server on the chat interface and changing the message input box of the chat interface to the search box. The search box may be linked with the search server and be an interface for transmitting a search query using input text as a search word to the search server. The search server may provide the terminal with a search result of the search query from a search engine. For example, the search server may provide the terminal with the search result through the messaging server. The examples of providing the search result to the terminal by the search server are described in detail below.

As another example, operation 110 of switching to the assistant mode may further include displaying the assistant function menu including at least one interfacing object for calling the assistant function on the chat interface. The interfacing object for calling the assistant function may be an object implemented to call the assistant function through interaction with a user and include a button implemented to output the assistant interface to provide the assistant function in response to a selection input of the user, for example. The assistant function menu may be displayed in at least a partial area of the chat interface. For example, the assistant function menu may be displayed adjacent to an area displaying the search box.

Figure 2:
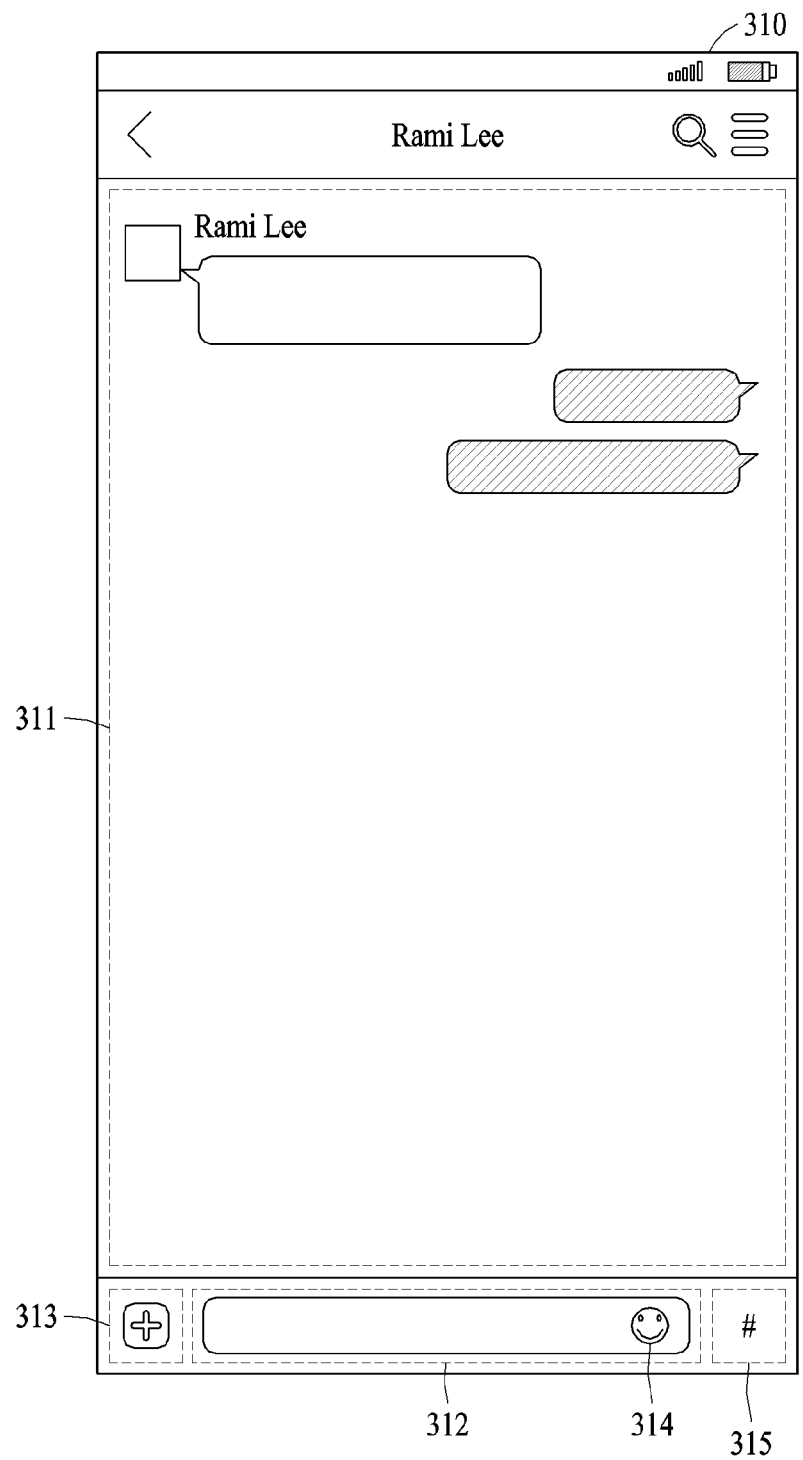
FIG. 2 is a diagram illustrating a screen of a chat interface corresponding to a chat mode, according to an embodiment.
Figure 3A:
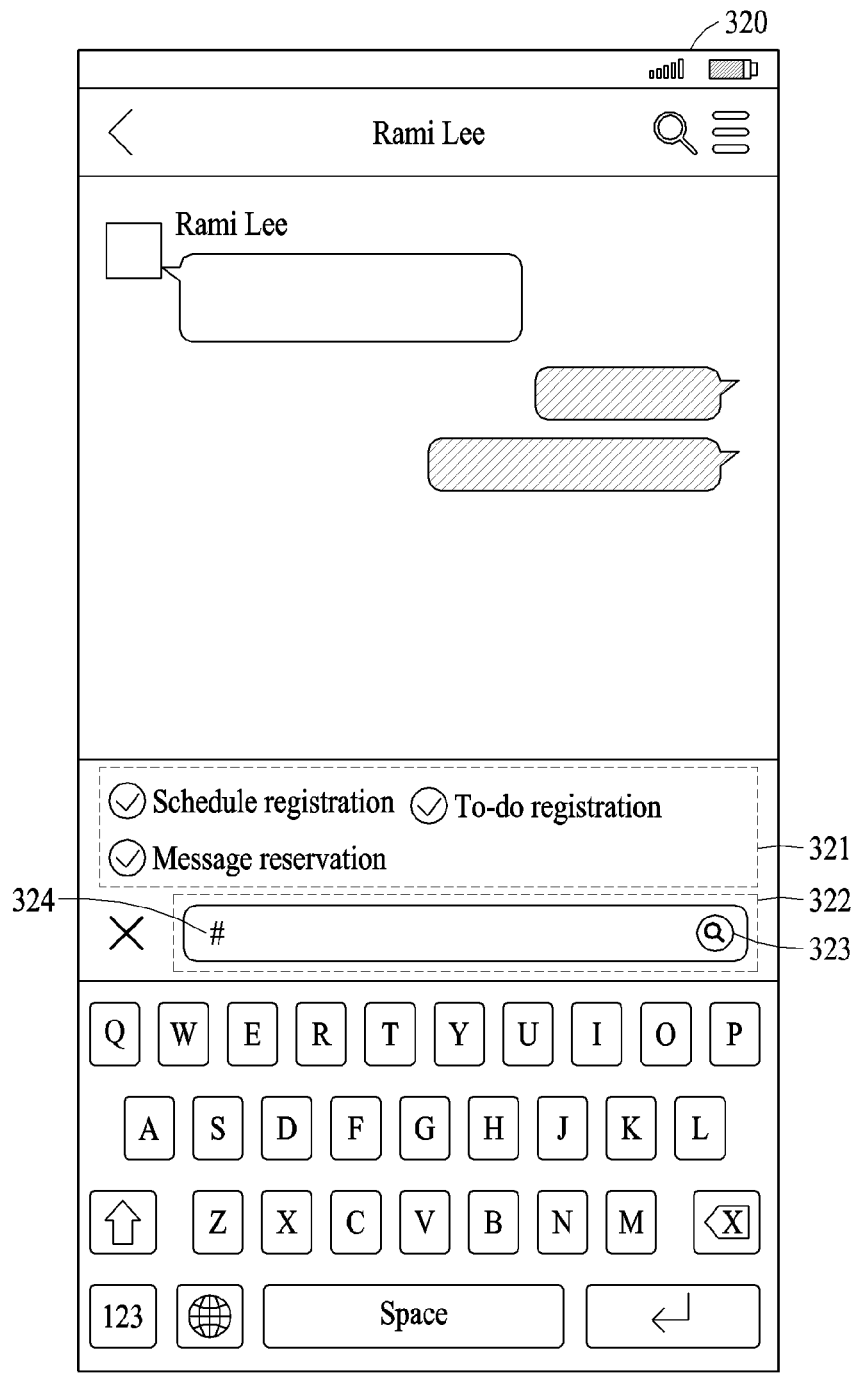
FIGS. 3A and 3B are diagrams illustrating a screen of a chat interface corresponding to an assistant mode, according to an embodiment.

An example of the chat interface corresponding to the assistant mode may include a screen 320 illustrated in FIG. 3A. Referring to FIG. 3A, the chat interface corresponding to the assistant mode may include an assistant function menu 321, a search box 322, and a button 323 for requesting a search. The descriptions of the chat interface according to the input mode are provided in detail below with reference to FIGS. 2, 3A, and 3B.

According to an embodiment, operation 120 may further include displaying the interfacing object for calling the assistant function activated in the assistant mode based on the type of the chatroom in which the request to execute the assistant mode is generated. In other words, the assistant function activated in the assistant mode may be determined based on the type of the chatroom in which the request to execute the assistant mode is generated.

According to an embodiment, whether to activate assistant function(s) may be determined according to the type of the chatroom. For example, in a first-type chatroom (e.g., the general chatroom or the chatroom with yourself), all the assistant functions may be activated, but in a second-type chatroom (e.g., the anonymous chatroom), some of the assistant functions may be deactivated. The chat interface corresponding to the assistant mode may include an interfacing object for calling the assistant function that is determined to be activated according to the type of the chatroom and may not include an interfacing object for calling the assistant function that is determined to be deactivated.

According to an embodiment, the server may determine whether to activate each of the assistant functions according to the type of the chatroom in which the request to execute the assistant mode is generated and provide the terminal with the chat interface corresponding to the assistant mode according to a determination result. For example, when the request to execute the assistant mode is generated in the first-type chatroom, the server may provide the terminal with the chat interface corresponding to the assistant mode including the interfacing object for calling all the assistant functions. As another example, when the request to execute the assistant mode is generated in the second-type chatroom, the server may provide the terminal with the chat interface corresponding to the assistant mode including the interfacing object for calling the assistant function that is activated in the second-type chatroom and not including the interfacing object for calling the assistant function that is deactivated. The chat interface corresponding to the assistant mode according to the type of the chatroom is described in detail below.

According to an embodiment, in operation 130, the terminal may receive the call for the assistant function through the chat interface switched to the assistant mode. For example, the terminal may call the assistant function corresponding to a selected interfacing object in response to receiving an input of selecting an interfacing object of the assistant function menu. As another example, the terminal may request a search result of a search word from the search server in response to a request to search the search word that is input to the search box.

According to an embodiment, in operation 140, the terminal may display the assistant interface corresponding to the called assistant function through a partial area in the chat interface. The assistant interface may be an interface to provide the called assistant function. For example, the assistant interface may include an interface to provide the search function through a chatroom (hereinafter, the search interface), an interface to provide the scheduling function (hereinafter, the scheduling interface), an interface to provide the to-do management function (hereinafter, the to-do management interface), and/or an interface to provide a reserved message management function (hereinafter, the reserved message management interface). The assistant interface is described in detail below.

According to an embodiment, the assistant interface to provide the assistant function may be added to the chat interface. For example, the assistant interface may be displayed in a partial area of the chat interface or overlaid on the chat interface.

According to an embodiment, the assistant interface may be displayed in an area displaying an interfacing object corresponding to the chat mode. For example, the assistant interface may be displayed by replacing the message input box included by the chat interface corresponding to the chat mode. In other words, a display of the message input box of the chat interface may be removed, and instead of the message input box, the assistant interface may be displayed. For example, when the search function is called through the chat interface corresponding to the assistant mode, the search box included by the search interface may be displayed by replacing the message input box. When any one of the scheduling function, the to-do management function, and the reserved message management function is called through the chat interface corresponding to the assistant mode, the display of the message input box may be removed, and the assistant interface corresponding to the called assistant function may be displayed. As another example, the assistant interface may be displayed in an area displaying the message input box and/or a virtual keyboard in the chat interface corresponding to the chat mode.

According to an embodiment, in operation 140, based on the type of the chatroom in which the request to execute the assistant mode is generated, the assistant interface including information on the chatroom is displayed. For example, when receiving a request to share a search result page, the search interface may display the identification information of the chatroom in which the request to execute the assistant mode is generated as the chatroom through which the search result page is shared. Based on the type of the chatroom, the information, for example, a participant in a schedule or a to-do list or a target of a reserved message, on the chatroom may not be displayed.

According to an embodiment, the terminal may remove the display of the assistant interface and display the message input box in response to the input mode of the chat interface switching to the chat mode for a message input. In other words, when the input mode is switched to the chat mode, the display of the assistant interface may be removed, and an interface corresponding to the chat mode may be displayed.

According to an embodiment, the operating method of the terminal may further include receiving a service corresponding to the called assistant function through the assistant interface. The terminal may receive the service corresponding to the called assistant function through the chat interface. The service corresponding to the assistant function may be provided to the server through the assistant interface added to the chat interface. The assistant interface may be determined based on the called assistant function. According to an embodiment, the assistant interface and the service corresponding to the assistant function provided through the assistant interface are described in detail below.

According to an embodiment, an operation of receiving the service corresponding to the called assistant function may include providing a service linked with the chatroom in which the request to execute the assistant mode is generated based on the called assistant function. For example, when the search function through the chatroom is called, a service to share a search result page of an input search word through the chatroom in which the request to execute the assistant mode is generated may be provided. As another example, when the scheduling function is called, a service to set a participant in the chatroom in which the request to execute the assistant mode is generated to be an invitation target to a schedule generated by the scheduling function may be provided. In yet another example, when the reserved message management function is called, a service to set the chatroom in which the request to execute the assistant mode is generated to be a receiver of a reserved message generated by the reserved message management function may be provided. The service corresponding to the assistant function is described in detail below.

Figure 3B:
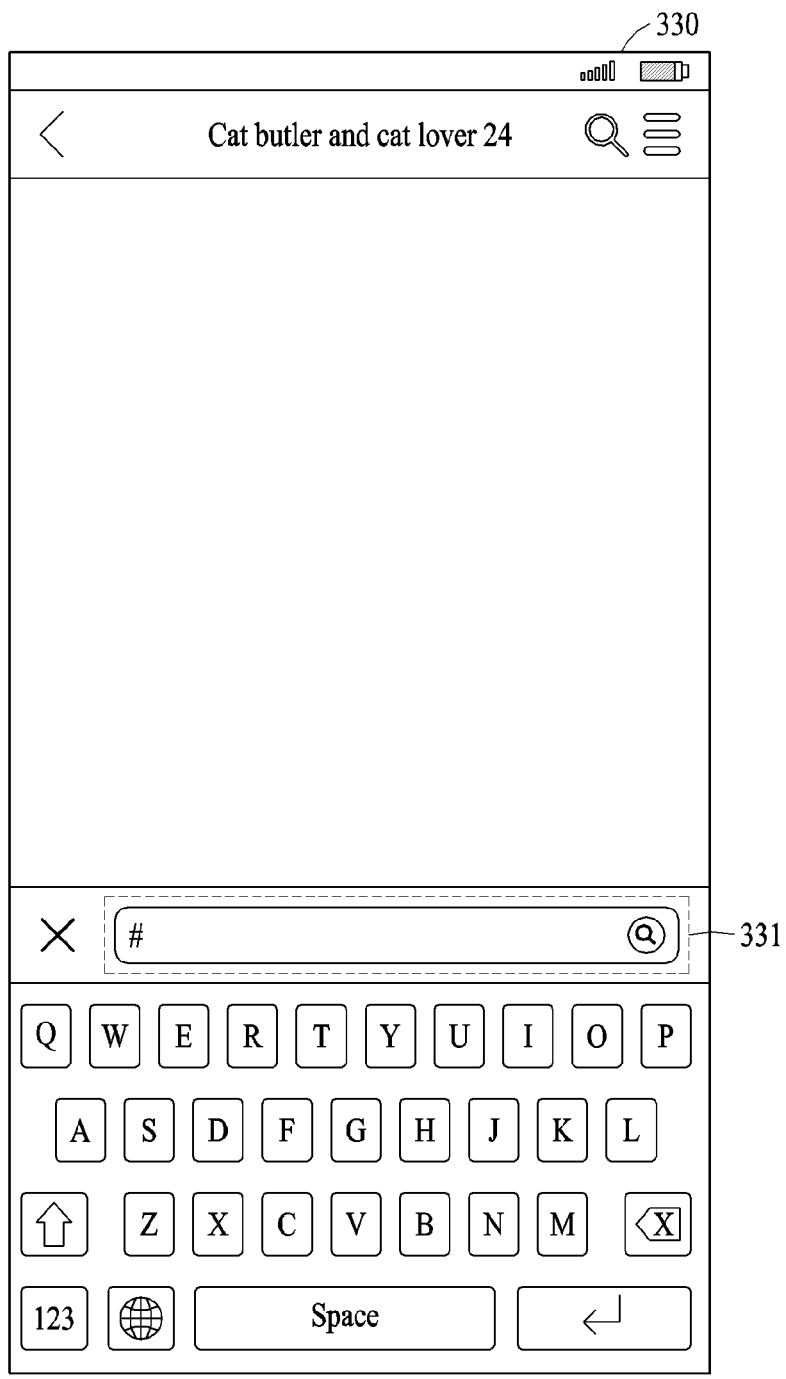

FIG. 2 is a diagram illustrating a screen of a chat interface corresponding to a chat mode, according to an embodiment, and FIGS. 3A and 3B are diagrams illustrating a screen of a chat interface corresponding to an assistant mode, according to an embodiment.

FIG. 2 is a diagram illustrating an example of a chat interface screen 310 corresponding to a chatroom provided to a terminal in response to access to the chatroom. As described above, the chat interface may include an interfacing object that supports a function related to a messaging service, such as a chatroom 311 through which transmitted and received messages are displayed, an input window 312 to which text to be transmitted as a message is input, and/or buttons 313, 314, and 315 through which a specific function or service is requested.

According to an embodiment, an input mode of the chat interface may be set to the chat mode. For example, referring to FIG. 2, when an input of selecting the message input box 312 is received, the input mode of the chat interface may be switched to the chat mode. As another example, the input mode of the chat interface may set the chat mode to be a default. When the input mode of the chat interface is set to be the chat mode, a virtual keyboard area for inputting a message to the message input box 312 may be displayed. Although not illustrated in FIG. 2, the chat interface corresponding to the chat mode may include an interfacing object to request the message transmission of text that is input to the message input box 312. The terminal may transmit the request to transmit the text that is input to the message input box 312 as a message to a server in response to an input received by the interfacing object to request the message transmission.

According to an embodiment, the terminal may receive an input of determining the input mode through the chat interface. For example, the chat interface may include the button 315 for requesting a switch to the assistant mode. When an input of selecting the button 315 is received, the input mode of the chat interface may be switched to the assistant mode. For example, in response to the input of selecting the button 315, the chat interface screen 310 may be switched to a chat interface screen 320 corresponding to the assistant mode of FIG. 3A. The shape of the button 315 included by the chat interface screen 310 is just an example of the interfacing object for requesting the switch to the assistant mode, but examples are not limited thereto. For example, the button 315 may be displayed in a different shape (e.g., a separate assistant mode icon) and may also be implemented in another type of an object that is not a button.

Referring to FIG. 3A, the chat interface corresponding to the assistant mode may include an assistant function menu 321 for calling an assistant function and a search box 322. For example, the message input box 312 included by the chat interface before being switched to the assistant mode may be changed to the search box 322, and the assistant function menu 321 may be added thereto. For example, an icon 324 indicating the search box 322 may be displayed such that the search box 322 may be distinguished from the message input box 312. The shape of the search box 322 illustrated in FIG. 3A is just an example, and the search box 322 may be implemented in various shapes different from the shape of a message input box. The assistant function menu 321 may include buttons for calling the assistant function. For example, the assistant function menu 321 may be displayed through a layer in a partial area in the chat interface. The chat interface corresponding to the assistant mode may include the search box 322 and a button 323 for requesting a search for a search word input to the search box 322.

According to an embodiment, when receiving an input of selecting the button 323 for requesting a search, the terminal may transmit the search word input to the search box 322 as a search query to a search server. The input of selecting the button 323 for requesting a search may be an input of calling a search function of the assistant function.

According to an embodiment, when receiving an input of selecting a button included by the assistant function menu 321, the terminal may call an assistant function corresponding to the selected button. In other words, the input of selecting the button included by the assistant function menu 321 may be an input of calling at least one assistant function.

According to an embodiment, the assistant interface corresponding to the called assistant function is described in detail below.

According to an embodiment, based on the type of a chatroom in which a request to execute the assistant mode is generated, the server may provide the chat interface corresponding to the assistant mode to the terminal. For example, in a first-type chatroom, all assistant functions may be activated. Referring to the chat interface screen 320 illustrated in FIG. 3A, when all the assistant functions are activated, the chat interface corresponding to the assistant mode may include an interfacing object for calling all the assistant functions. For example, the chat interface corresponding to the assistant mode corresponding to the first-type chatroom may include the assistant function menu 321 including the search box 322 for calling the search function and an interfacing object for calling a scheduling function, a to-do management function, and a reserved message management function. For example, the assistant function menu 321 may receive an input (e.g., a swipe input, a drag input, etc.) for the navigation of a plurality of interfacing objects and be implemented to display an arrangement of the interfacing objects.

In addition, in a second-type chatroom, some of the assistant functions may be deactivated. For example, when the chatroom in which the request to execute the assistant mode is generated is identified as the second-type chatroom in which some functions of the assistant mode are restricted, a screen 330 of FIG. 3B may be displayed.

Referring to FIG. 3B, when the chatroom in which the request to execute the assistant mode is generated is identified as a second type, the search function may only be activated among the assistant functions, and the rest (e.g., the scheduling function, the to-do management function, and the reserved message management function) of the assistant functions may be deactivated. The chat interface corresponding to the assistant mode may not include an interfacing object for calling a deactivated assistant function. For example, the assistant mode, provided to the second-type chatroom, corresponding to the chat interface may include a search box 331 for calling the search function and may not include an assistant function menu for calling another assistant function.

Unlike the example illustrated in FIG. 3B, when the search function is deactivated among the assistant functions in a certain type of a chatroom, the chat interface corresponding to the assistant mode may include a message input box instead of the search box 331, and an interfacing object for calling an activated assistant function may be added thereto. In other words, based on the type of the chatroom in which the request to execute the assistant mode is generated, whether to activate each of the assistant functions may be determined. Based on the type of a chatroom, the chat interface corresponding to the assistant mode may include the interfacing object for calling an activated assistant function and may not include the interfacing object for calling a deactivated assistant function.

Figure 4A:
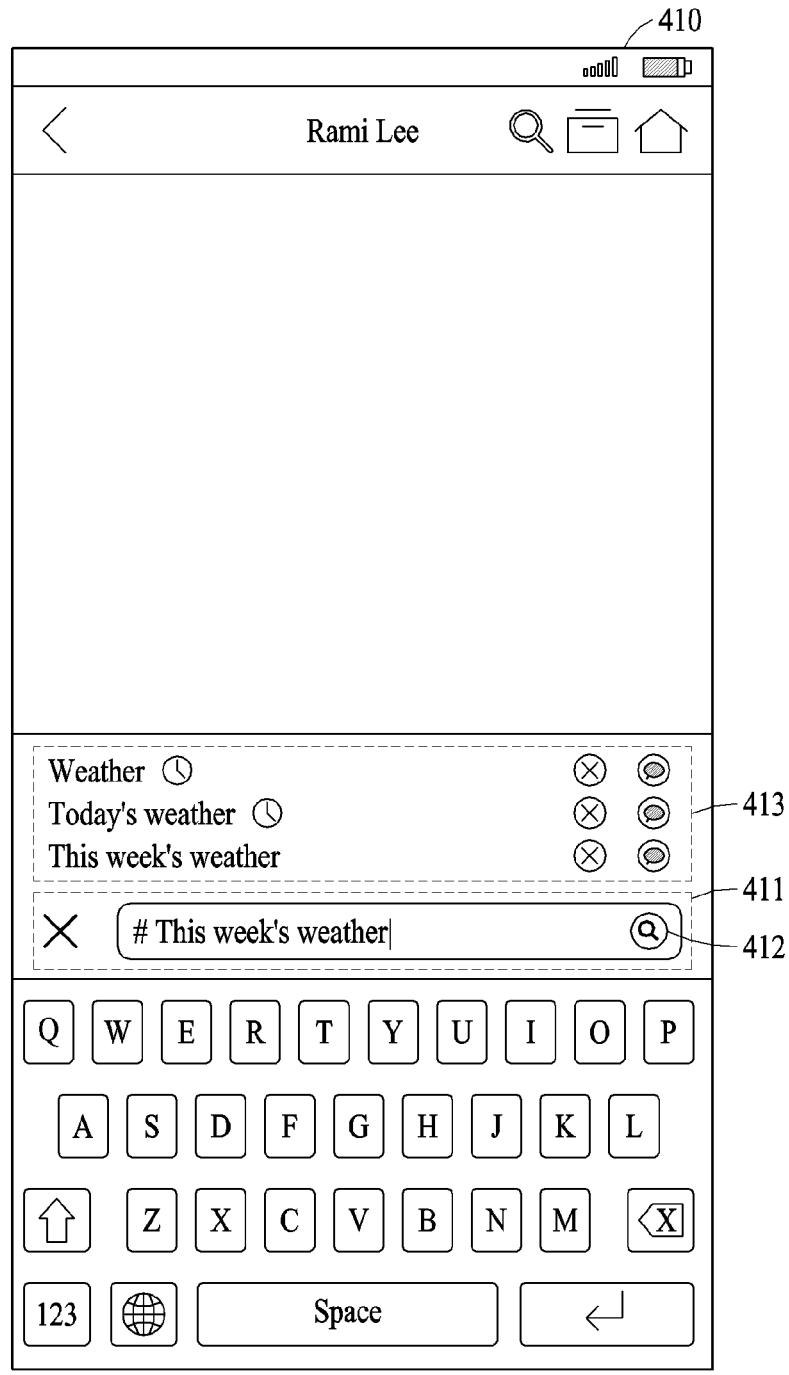
FIGS. 4A to 4C are diagrams illustrating a screen of a search interface according to an embodiment.
Figure 4B:
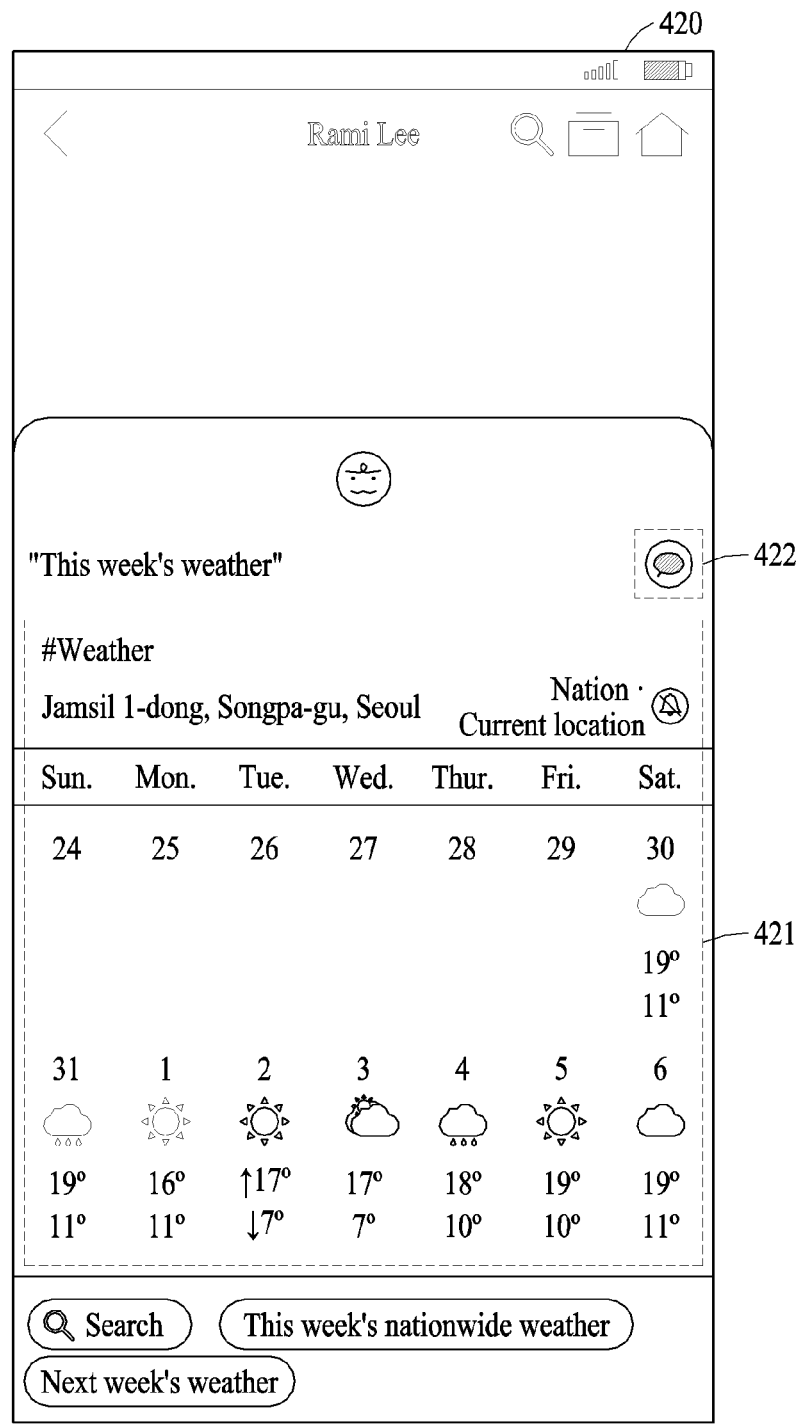
Figure 4C:
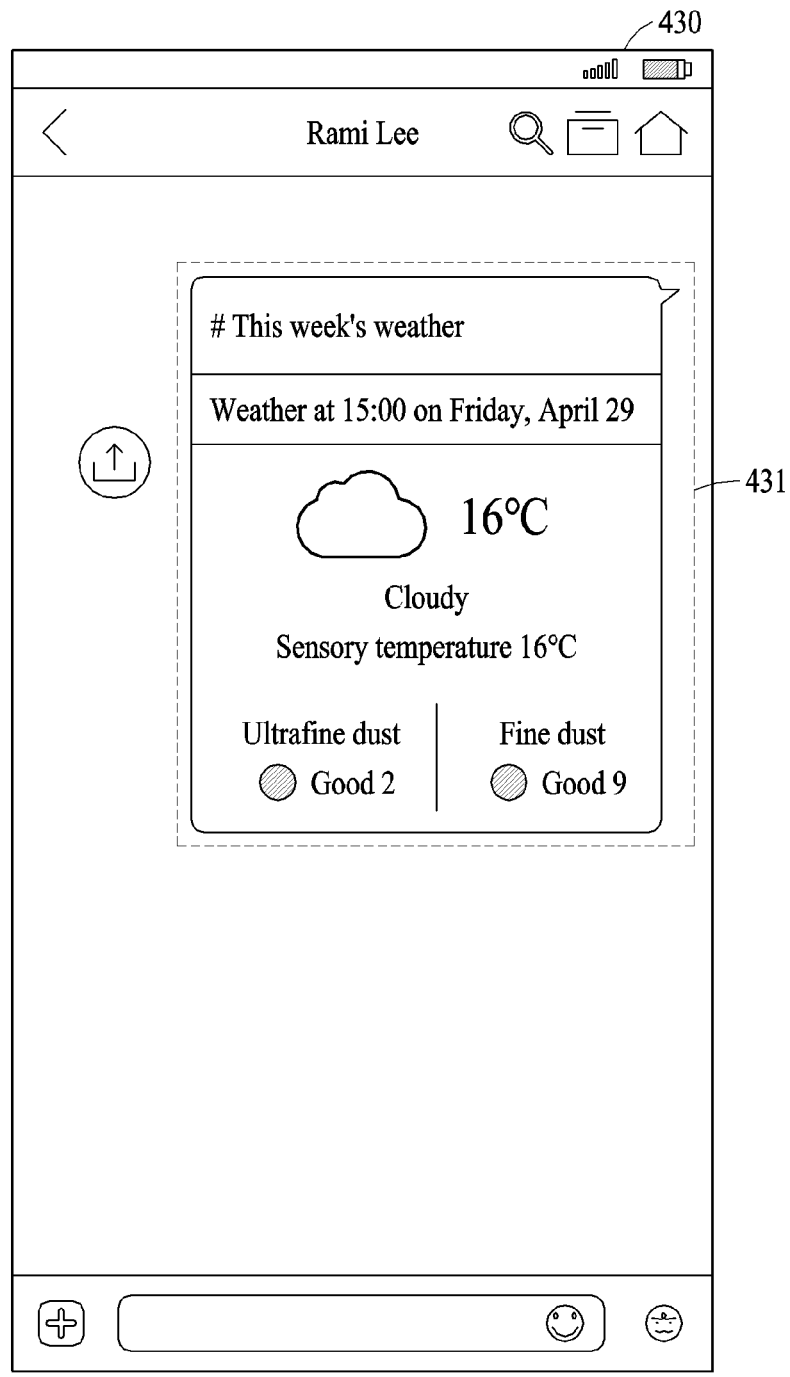

FIGS. 4A to 4C are diagrams illustrating a screen of a search interface according to an embodiment.

Referring to a screen 410 illustrated in FIG. 4A, when a search function is called through a chat interface that is switched to an assistant mode, the search interface may be displayed in a partial area in the chat interface. A text input through a chat box may be a call for the search function. The search interface may be an interface for providing the search function through a chatroom and include a search box 411 to which a search word is input, a button 412 for requesting a search for the search word, and a suggest area 413 for the search word. In the suggest area 413 for a search word, a search word associated with an input search word and/or a past search record of a user account may be displayed.

For example, when receiving an input of selecting the button 412 for requesting a search through the search interface, the terminal may transmit a search request including 'this week's weather' input to the search box 411 as a search query to a search server. The search server may provide the terminal with a search result page. Referring to a screen 420 illustrated in FIG. 4B, the search interface may include a view 421 for displaying the search result page corresponding to the search query. When a search request input for a search word is received through the search interface, the search interface may be expanded to display the search result page. The search result page received from the search server through the view 421 may be displayed in a partial area in the chat interface. For example, the transmission and reception of data for the search function, such as the transmission of the search query between the terminal and the search server and the search result page, may be relayed by the server.

According to an embodiment, the search interface may provide a function of sharing the search result page through a chatroom. For example, the search interface may include a button 422 for requesting the sharing of the search result page. A user may request the sharing of the search result page from the server through an input of selecting the button 422. The request for the sharing of the search result page may be transmitted to the server through the search server. For example, when a search request for a search word that is input through a search box is transmitted to the search server, the search server may provide information on the search result page for the search word to the server. The information on the search result page provided to the server may include information to provide the search result page in a message form to the terminal. Based on the information on the search result page, the server may transmit a message connecting to the search result page through the chat interface to the terminal in which the search request occurs.

According to an embodiment, the search result page may be shared through a chatroom in a message form. The chatroom through which the search result page is shared may be a chatroom in which a request to execute an assistant function occurs. In addition, the search result page may be shared through another chatroom in which the user account participates, besides the chatroom in which the request to execute the assistant function occurs.

Referring to a screen 430 illustrated in FIG. 4C, the search result page may be shared through a chatroom in a form of a message 431. When the request to share the search result page is received, the message 431 including a route connecting the server to the search result page may be generated. The terminal may access the search result page that is provided by the search server through the message 431 corresponding to the search result page. For example, when receiving an input of selecting the message 431, the terminal may access the search result page based on the route included by the selected message 431.

Figure 5A:
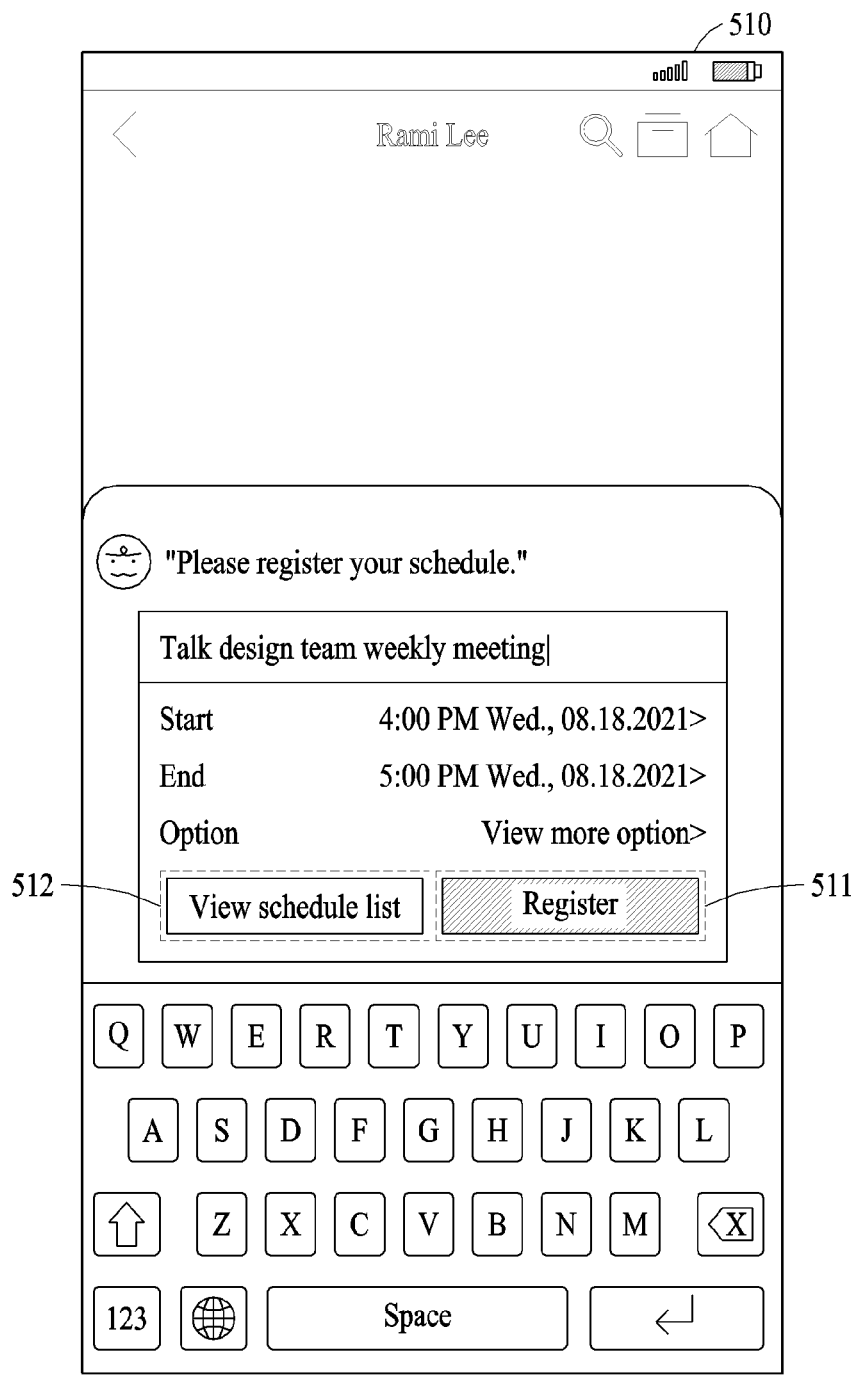
FIGS. 5A to 5C are diagrams illustrating a screen of a scheduling interface according to an embodiment.
Figure 5B:
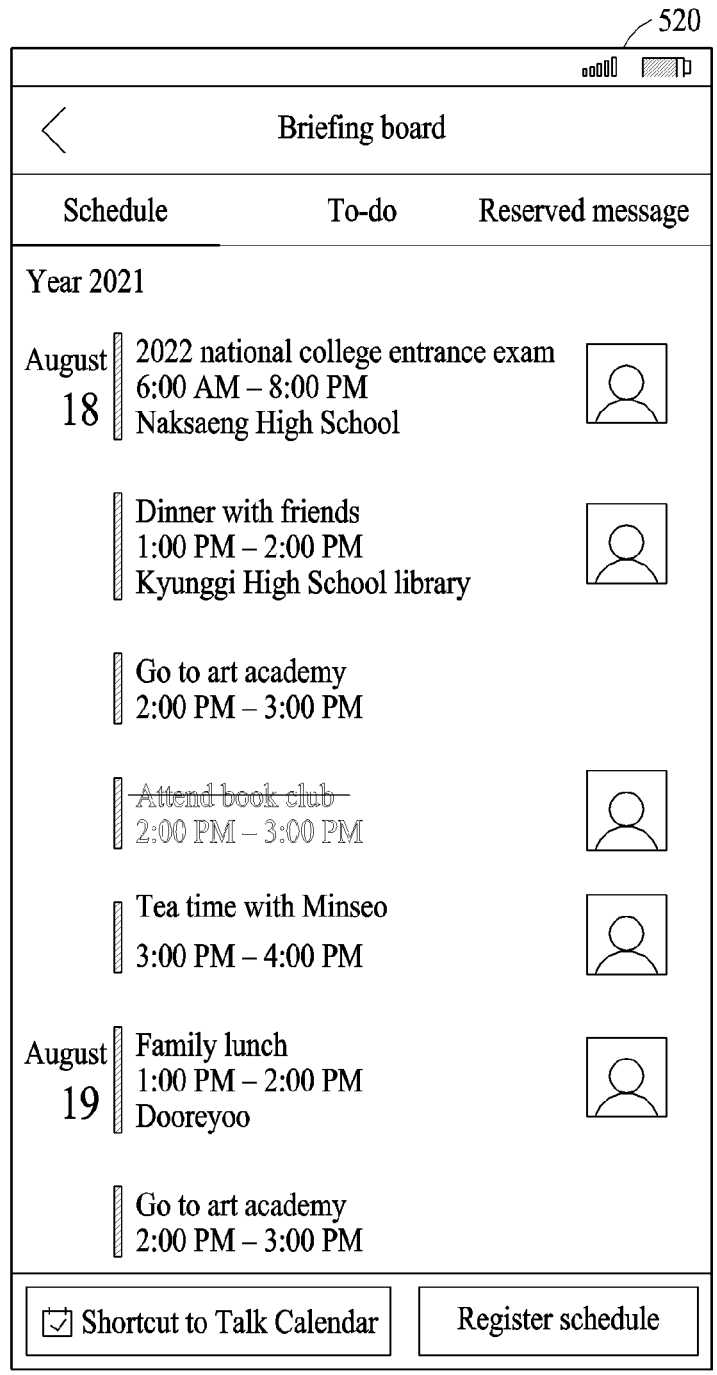
Figure 5C:
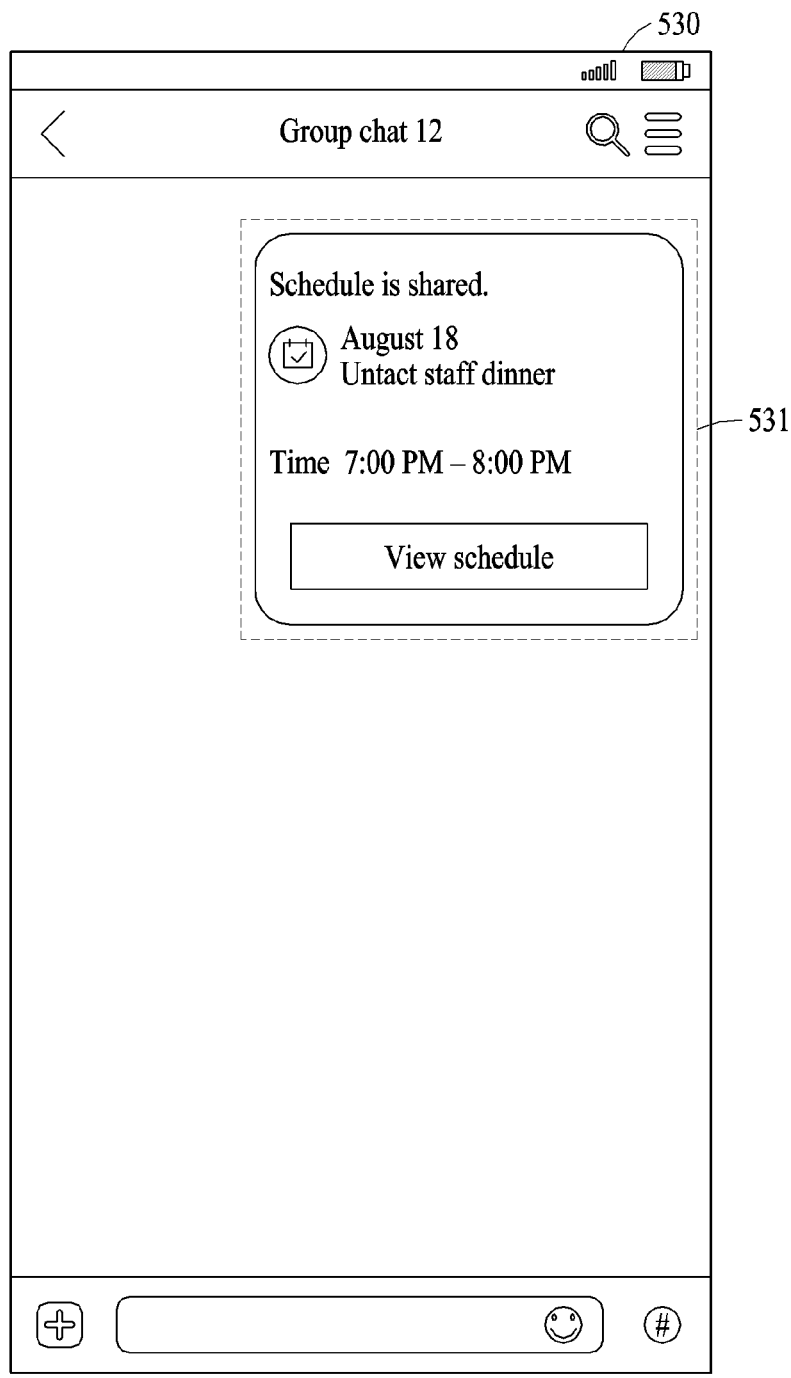

FIGS. 5A to 5C are diagrams illustrating a screen of a scheduling interface according to an embodiment.

Referring to an interface screen 510 illustrated in FIG. 5A, when a scheduling function is called through a chat interface that is switched to an assistant mode, the scheduling interface may be displayed in a partial area in the chat interface. For example, in the assistant function menu 321 illustrated in FIG. 3A, an input of selecting a 'schedule registration' button may be a call for the scheduling function. The scheduling interface may provide a function of registering a new schedule and a function of retrieving and editing the registered schedule. For example, a user may input information (e.g., a name of a schedule and a time of the schedule) on a new schedule through the scheduling interface. The user may request a server to generate a schedule through an input of selecting a 'register' button 511 of the scheduling interface. The server may generate the requested schedule and register the generated schedule in a calendar under an account of the user.

According to an embodiment, when generating a schedule, the user may set a target to be invited to the generated schedule through the scheduling interface. The target to be invited to the schedule may include at least one user account and/or at least one chatroom. When a chatroom is set to be the target to be invited to the schedule, a user account participating in the chatroom may be set to be a target of invitation.

According to an embodiment, the server may automatically input chatroom information to the target (or the target of invitation) to be invited to the schedule based on the type of a chatroom in which a request for the scheduling function occurs. For example, when the request for the scheduling function occurs through a general chatroom in which two or more user accounts participate, the user accounts participating in the chatroom may be automatically input to the target to be invited to the schedule. The user requesting the generation of a schedule may perform modifications, such as deleting the target of invitation that is automatically input through the scheduling interface and adding a new target of invitation. For example, when the request for the scheduling function occurs through an anonymous chatroom or a chatroom with yourself, a user account participating in the chatroom may not be automatically input to the target to be invited to the schedule. The user requesting the generation of a schedule may input user account(s) registered as a friend and/or participating account(s) in participating chatroom(s) as the target of invitation through the scheduling interface.

According to an embodiment, the user may request the retrieving of a registered schedule through the scheduling interface. For example, the user may request the retrieving of a schedule registered in the server through an input of selecting 'view a schedule list' button 512 of the scheduling interface. In response to the request for the retrieving of a schedule, the interface screen 510 displayed in the terminal may be switched to an interface screen 520, for retrieving the schedule, illustrated in FIG. 5B. Referring to the interface screen 520 illustrated in FIG. 5B, a list of at least one schedule registered in a calendar corresponding to a user account may be displayed through the scheduling interface.

Referring to a screen 530 illustrated in FIG. 5C, a schedule generated through the scheduling interface may be shared through a chatroom in a form of a message 531. When a request to share a schedule generated through the scheduling interface is received, the message 531 for accessing data on the schedule generated in the server may be generated. The terminal may access a page for retrieving the generated schedule through the message 531 corresponding to the schedule. For example, when receiving an input of selecting the message 531, the terminal may access the page for retrieving the generated schedule based on a route included by the selected message 531.

According to an embodiment, when generating a schedule, the user may set a target (or a sharing target) with which the generated schedule is shared through the scheduling interface. The sharing target of a schedule and the target of invitation of the schedule described above are distinguished from each other and may be set independently of each other. The target with which a schedule is shared may include at least one user account and/or at least one chatroom. When a specific chatroom is set to be the target with which a schedule is shared, a message corresponding to the schedule may be transmitted to the chatroom. When a specific user account is set to be the target with which a schedule is shared, a message corresponding to the schedule may be transmitted to a chatroom with the user account.

According to an embodiment, the server may automatically input chatroom information to the target with which a schedule is shared based on the type of a chatroom in which a request for the scheduling function occurs. For example, when the request for the scheduling function occurs through a general chatroom in which two or more user accounts participate, the chatroom or the user accounts participating in the chatroom may be automatically input into the target with which a schedule is shared. The user requesting the generation of a schedule may perform modifications, such as deleting the sharing target that is automatically input through the scheduling interface and adding a new sharing target. In addition, when the request for the scheduling function occurs through an anonymous chatroom or a chatroom with yourself, chatroom information corresponding to the anonymous chatroom may not be automatically input to the target with which a schedule is shared. The user requesting the generation of a schedule may input user account(s) registered as a friend and/or participating chatroom(s) as the sharing target through the scheduling interface.

Figure 6A:
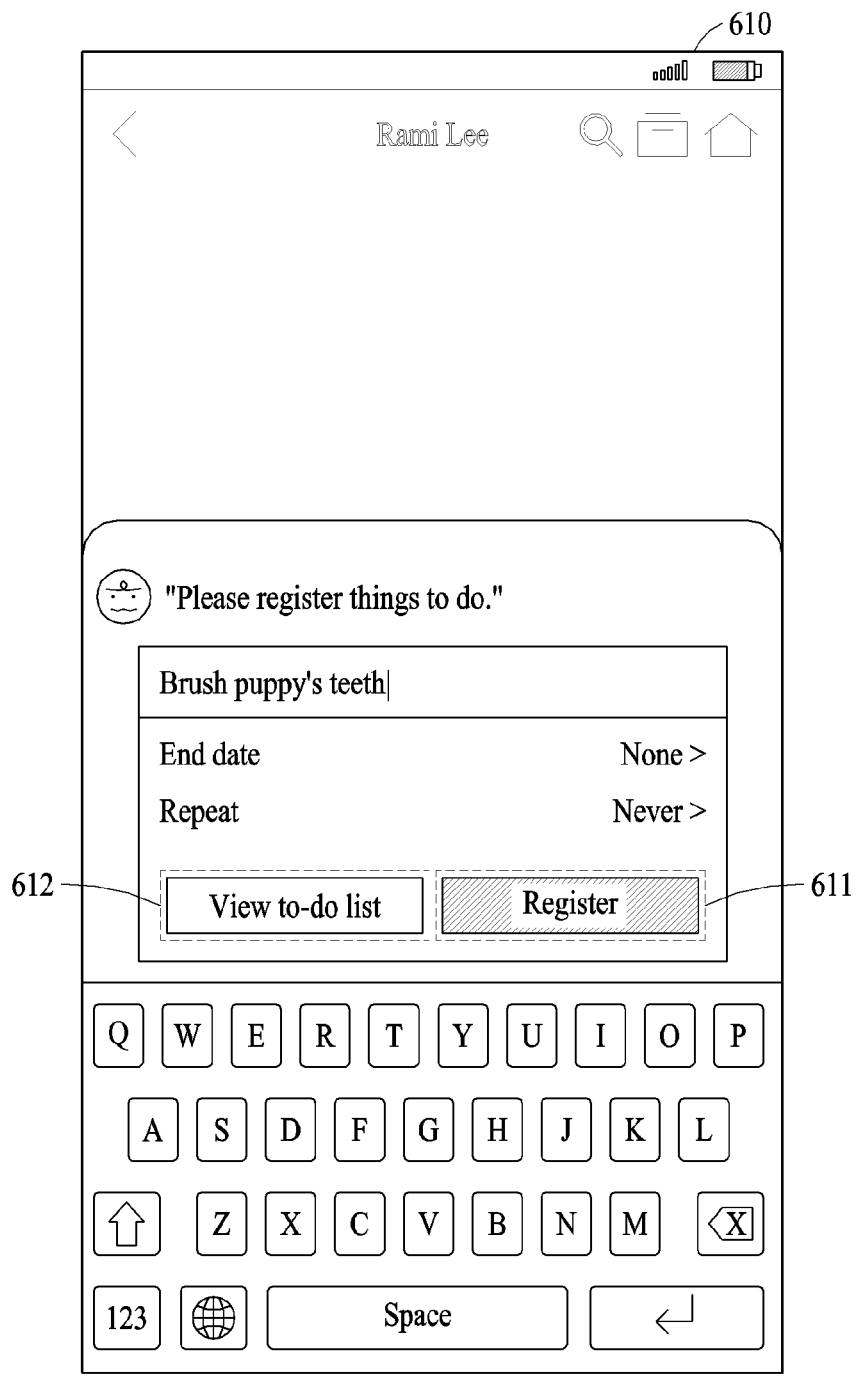

FIGS. 6A and 6B are diagrams illustrating a screen of a to-do management interface according to an embodiment.

Referring to an interface screen 610 illustrated in FIG. 6A, when a to-do management function is called through a chat interface that is switched to an assistant mode, the to-do management interface may be displayed in a partial area in the chat interface. For example, in the assistant function menu 321 illustrated in FIG. 3A, an input of selecting a 'to-do registration' button may be a call for the to-do management function. The to-do management interface may provide a function of registering a new to-do and a function of retrieving and editing the registered to-do. For example, a user may input information (e.g., a name of a to-do, an end date of the to-do, and the number of repetitions) on a new to-do through the to-do management interface. The user may request a server to generate a to-do item through an input of selecting a 'register' button 611 of the to-do management interface. The server may generate the to-do item including information on the new to-do according to the request of the user and register the generated to-do item in a to-do database under an account of the user.

According to an embodiment, the user may request the retrieving of a registered to-do through the to-do management interface. For example, the user may request the retrieving of information on a to-do registered in the server through an input of selecting 'view a to-do list' button 612 of the to-do management interface. In response to the request for the retrieving, the interface screen 610 displayed in the terminal may be switched to an interface screen 620, for retrieving the information on the to-do, illustrated in FIG. 6B. Referring to the interface screen 620 illustrated in FIG. 6B, a list including at least one to-do item registered in a to-do database corresponding to a user account may be displayed through the to-do management interface.

Figure 7A:
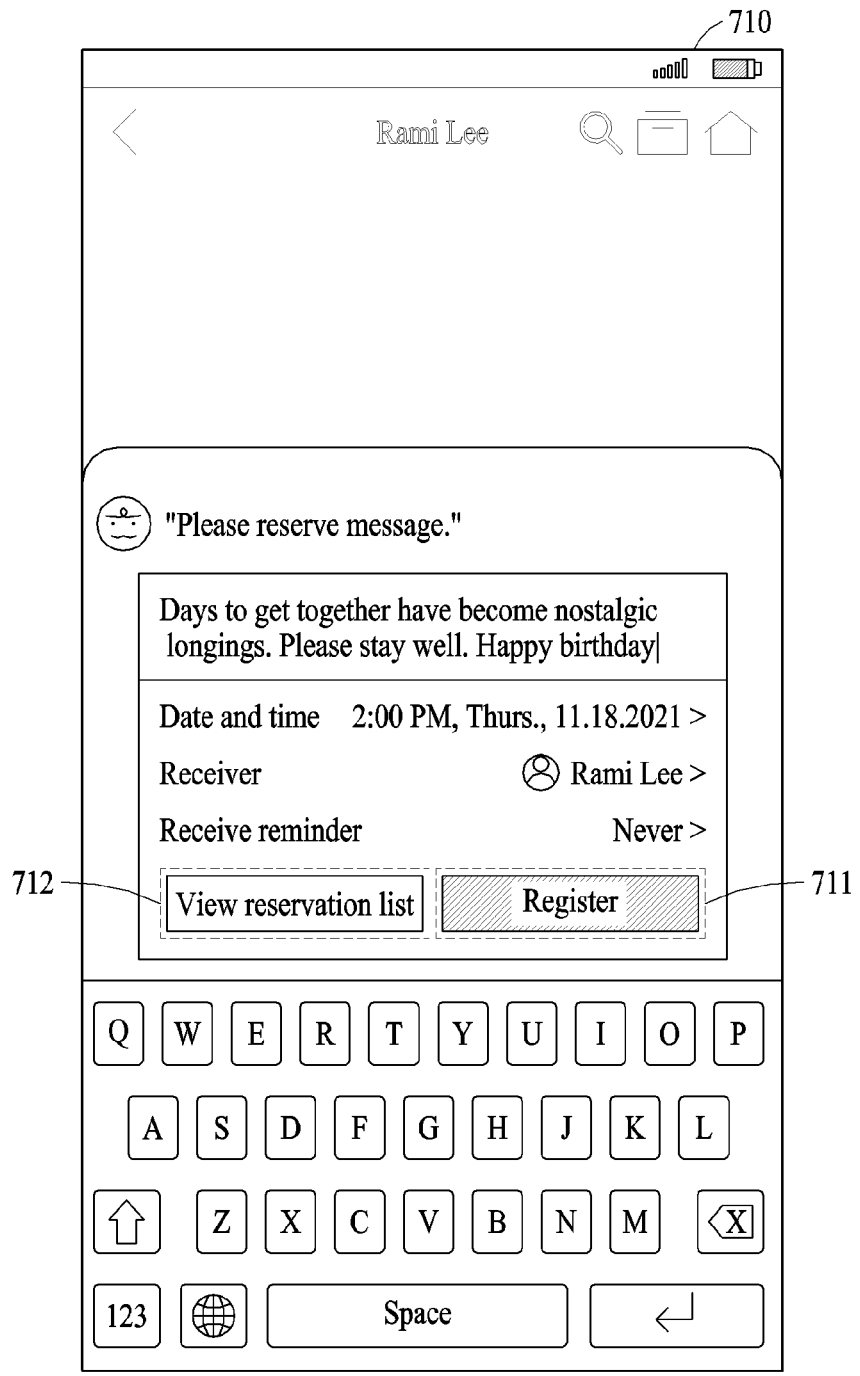
FIGS. 7A and 7B are diagrams illustrating a screen of a reserved message management interface according to an embodiment.
Figure 7B:
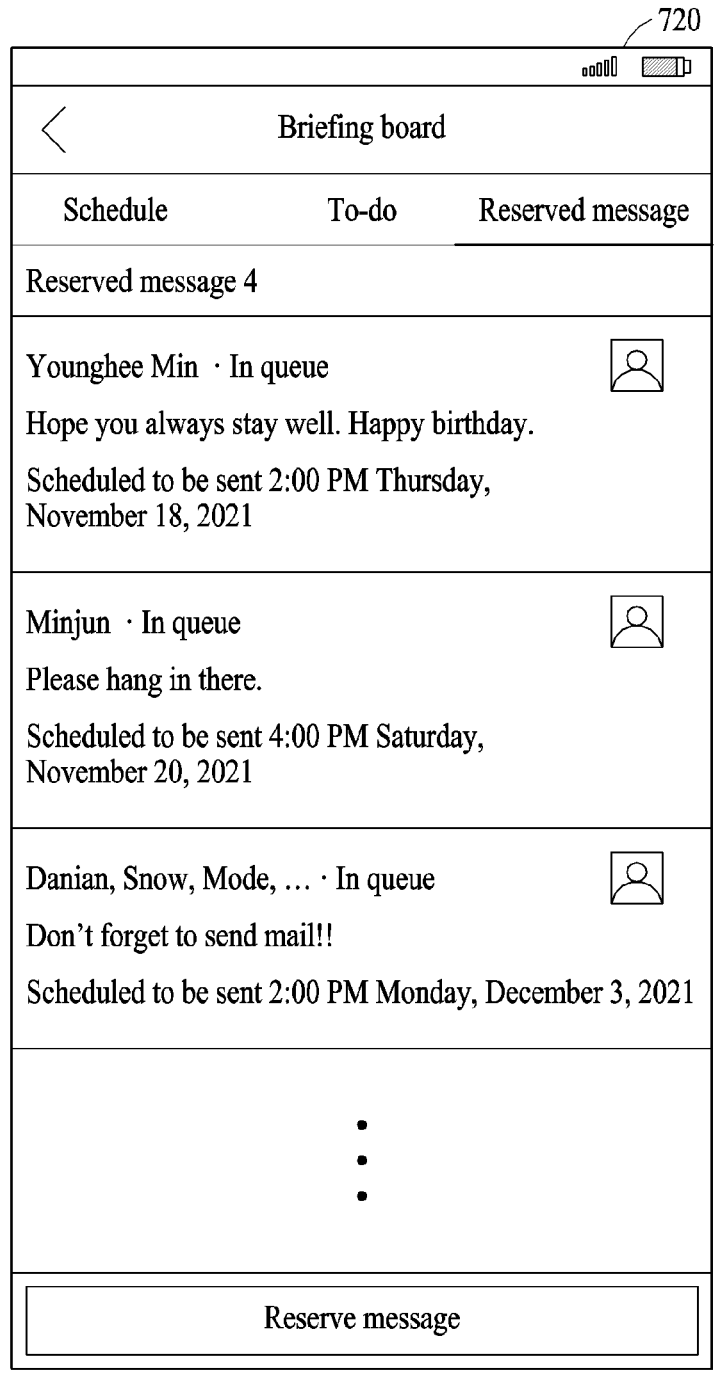

FIGS. 7A and 7B are diagrams illustrating a screen of a reserved message management interface according to an embodiment.

Referring to an interface screen 710 illustrated in FIG. 7A, when a reserved message management function is called through a chat interface that is switched to an assistant mode, the reserved message management interface may be displayed in a partial area in the chat interface. For example, in the assistant function menu 321 illustrated in FIG. 3A, an input of selecting a 'message reservation' button may be a call for the reserved message management function. The reserved message management interface may provide a function of registering a new reserved message and a function of retrieving and editing the registered reserved message. For example, a user may input information (e.g., the content of a reserved message, a transmission date of the reserved message, a reserved message transmission target, and notification setting of the reserved message) on a new reserved message through the reserved message management interface. The user may request a server to generate a reserved message through an input of selecting a 'register' button 711 of the reserved message management interface. The server may generate the requested reserved message and register the generated reserved message in a reserved message database under an account of the user.

According to an embodiment, when generating a reserved message, the user may set a transmission target (or a receiver) of the generated reserved message through the reserved message management interface. The reserved message transmission target may include at least one user account and/or at least one chatroom. When a chatroom is set to be the reserved message transmission target, the chatroom and/or user account(s) participating in the chatroom may be set to be the reserved message transmission target.

According to an embodiment, the server may automatically input chatroom information to the reserved message transmission target based on the type of a chatroom in which a request for the reserved message management function occurs. For example, when the request for the reserved message management function occurs through a general chatroom in which two or more user accounts participate, the chatroom or the user accounts participating in the chatroom may be automatically input into the reserved message transmission target. For example, when the request for the reserved message management function occurs through a chatroom with yourself, the reserved message transmission target may be automatically input to an account of the user themselves who has requested the reserved message transmission target to generate the reserved message. The user requesting the generation of a reserved message may perform modifications, such as deleting the reserved message transmission target that is automatically input through the reserved message management interface and adding a new reserved message transmission target. For example, when the request for the reserved message management function occurs through an anonymous chatroom, chatroom information corresponding to the anonymous chatroom may not be automatically input to the reserved message transmission target. The user requesting the generation of a reserved message may input user account(s) registered as a friend and/or participating chatroom(s) as the reserved message transmission target through the reserved message management interface.

According to an embodiment, the user may request the retrieving of a registered reserved message through the reserved message management interface. For example, the user may request the retrieving of a reserved message registered in the server through an input of selecting 'view a reservation list' button 712 of the reserved message management interface. In response to the request for the retrieving of the reserved message, the interface screen 710 displayed in the terminal may be switched to an interface screen 720, for retrieving the reserved message, illustrated in FIG. 7B. Referring to the interface screen 720 illustrated in FIG. 7B, a list including at least one reserved message registered in a reserved message database corresponding to a user account may be displayed through the reserved message management interface.

Figure 8:
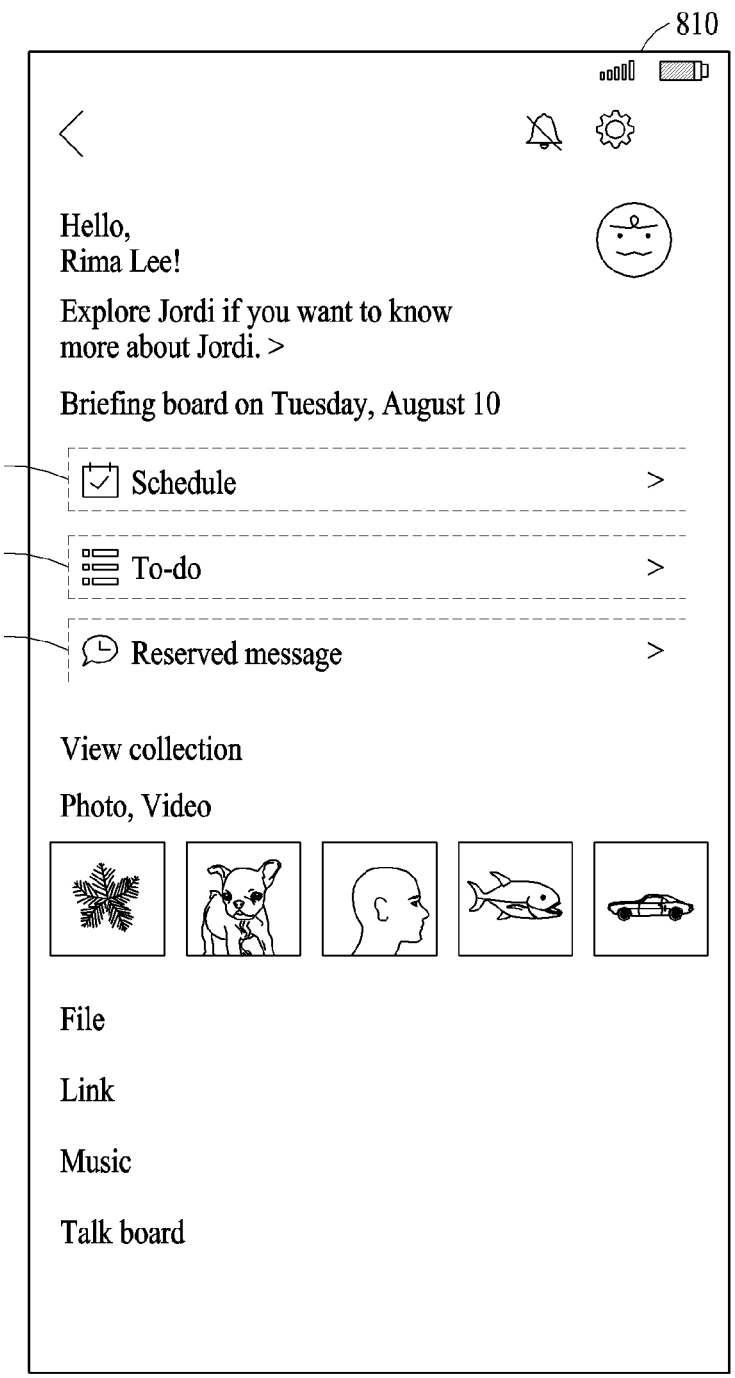
FIG. 8 is a diagram illustrating an assistant interface screen provided through a messenger application, according to an embodiment.

FIG. 8 is a diagram illustrating an assistant interface screen provided through a messenger application, according to an embodiment.

According to an embodiment, the messenger application may provide a terminal with the assistant interface for calling an assistant function through various entry points, besides a request to execute an assistant mode through a chatroom. For example, when the request to execute the assistant mode is received through various entry points in the messenger application, an assistant interface screen 810 illustrated in FIG. 8 may be output through the terminal. The assistant interface may include interfacing objects 811, 812, and 813 for calling assistant functions (e.g., a scheduling function, a to-do management function, and a reserved message management function).

According to an embodiment, an input of selecting the interfacing objects 811, 812, and 813 may be a call for the assistant functions respectively corresponding to respective inputs of selecting 'schedule registration,' 'to-do registration,' and 'message reservation' buttons included by the assistant function menu 321 included by a chat interface corresponding to the assistant mode illustrated in FIG. 3A. The assistant interface provided in response to the input of selecting the interfacing objects 811, 812, and 813 may be displayed through a whole area in which a screen of the messenger application is output, instead of being displayed through a partial area in the chat interface.

According to an embodiment, the terminal on which an application for a messaging service is installed may include a processor, a memory, and an input/output device.

According to an embodiment, the processor of the terminal may perform at least one operation of the terminal described above with reference to FIG. 1. For example, the processor of the terminal may perform at least one of an operation of switching an input mode of the chat interface to the assistant mode for calling an assistant function, an operation of receiving a call for the assistant function, and an operation of displaying the assistant interface corresponding to the called assistant function.

According to an embodiment, the memory of the terminal may store data necessary for performing the operations described above with reference to FIG. 1 and/or data generated by performing the operations described above with reference to FIG. 1. The memory may be a volatile memory or a non-volatile memory.

According to an embodiment, the memory of the terminal may store a program implementing the operating method of the terminal described above with reference to FIG. 1. The processor of the terminal may execute the program stored in the memory and control the terminal. The code of the program executed by the processor of the terminal may be stored in the memory.

According to an embodiment, the terminal may be connected to an external device (e.g., a personal computer or a network) through the input/output device and exchange data therewith. For example, the terminal may receive a user's touch input, text input, voice input, and/or other inputs through the input/output device and output a screen of an interface provided through an application.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random-access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An operating method of a terminal on which an application for a messaging service is installed, the operating method comprising:
identifying a first type of a first chatroom of the application, wherein the first type of the first chatroom indicates that the first chatroom is an anonymous chatroom;
displaying an interfacing object for calling an assistant mode;
receiving a call, associated with the first chatroom, for the assistant mode through the interfacing object;
displaying a first assistant interface corresponding to the called assistant mode and corresponding to the first chatroom, wherein the first assistant interface provides, based on the first type of the first chatroom, access to one or more first assistant functions and prevents access to one or more second assistant functions;
identifying a second type of a second chatroom of the application, wherein the second type is different from the first type;
receiving a call, associated with the second chatroom, for the assistant mode through the interfacing object; and
displaying a second assistant interface corresponding to the called assistant mode and corresponding to the second chatroom, wherein the second assistant interface provides, based on the second type of the second chatroom, access to the one or more second assistant functions.

2. The operating method of claim 1, wherein the one or more second assistant functions comprise at least one of a search function through a chatroom, a scheduling function, a to-do management function, and a reserved message management function.

3. The operating method of claim 1, wherein the displaying the interfacing object comprises at least one of:
displaying a search box linked with a search server on a chat interface of the application; and
changing a message input box of the chat interface to the search box.

4. The operating method of claim 1, wherein the first assistant interface comprises an assistant mode menu comprising at least one interfacing object for calling at least one of the one or more first assistant functions.

5. The operating method of claim 1, wherein the displaying the interfacing object further comprises displaying an indication of the one or more first assistant functions.

6. The operating method of claim 1, wherein the displaying the first assistant interface corresponding to the called assistant mode comprises displaying information on the first chatroom based on the first type of the first chatroom.

7. The operating method of claim 1, further comprising:

based on input indicating a switch to a chat mode, replacing display of the first assistant interface with a message input box of a chat interface of the first chatroom.

8. The operating method of claim 1, further comprising: receiving a service corresponding to at least one of the one or more first assistant functions.

9. The operating method of claim 1, further comprising: displaying the first chatroom, wherein the first chatroom comprises:
   a first chat display window of the messaging service; and
   a first user input interface configured to receive one or more user inputs associated with the first chatroom, wherein:
      while the first chat display window displays at least a portion of chat messages of the first chatroom, the first user input interface is configured to switch between a first chat mode and a first assistant mode,
      during the first chat mode being executed, the first user input interface is configured to receive a user input associated with the first chat mode and associated with at least one additional chat communication for display in the first chat display window, and
      during the first assistant mode being executed, the first user input interface is configured to receive a user input associated with the first assistant mode and the first user input interface is linked to an interfacing object configured to execute at least one assistant user interface associated with the first type of the first chatroom;
   displaying the second chatroom, wherein the second chatroom comprises:
      a second chat display window of the messaging service; and
      a second user input interface configured to receive one or more user inputs associated with the second chatroom, wherein:
         while the second chat display window displays at least a portion of chat messages of the second chatroom, the second user input interface is configured to switch between a second chat mode and a second assistant mode different from the first assistant mode,
         during the second chat mode being executed, the second user input interface is configured to receive a user input associated with the second chat mode and associated with at least one additional chat communication for display in the second chat display window, and
         during the second assistant mode being executed, the second user input interface is configured to receive a user input associated with the second assistant mode and the second user input interface is linked to an interfacing object configured to execute at least one assistant user interface associated with the second type of the second chatroom different from the first type of the first chatroom.

10. A terminal on which an application for a messaging service is installed, the terminal comprising:
   a processor configured to:
      identify, based on identities of participants in a first chatroom, a first type of the first chatroom of the application, wherein the first type of the first chatroom indicates that the first chatroom is a public chatroom;
      display an interfacing object for calling an assistant mode;
      receive a call, associated with the first chatroom, for the assistant mode through the interfacing object,
      display a first assistant interface corresponding to the called assistant mode and corresponding to the first chatroom, wherein the first assistant interface provides, based on the first type of the first chatroom, access to one or more first assistant functions and prevents access to one or more second assistant functions;
      identifying a second type of a second chatroom of the application, wherein the second type is different from the first type;
      receiving a call, associated with the second chatroom, for the assistant mode through the interfacing object; and
      displaying a second assistant interface corresponding to the called assistant mode and corresponding to the second chatroom, wherein the second assistant interface provides, based on the second type of the second chatroom, access to the one or more second assistant functions.

11. The terminal of claim 10, wherein:
the one or more second assistant functions comprise at least one of a search function through a chatroom, a scheduling function, a to-do management function, and a reserved message management function.

12. The terminal of claim 10, wherein
the processor is further configured to, when displaying the interfacing object,
   display a search box linked with a search server on a chat interface of the application, and
   change a message input box of the chat interface to the search box.

13. The terminal of claim 10, wherein
the processor is further configured to, based on input indicating a switch to a chat mode, replace display of the first assistant interface with a message input box.

14. A terminal comprising:
a communication interface;
at least one processor; and
memory storing instructions that, when executed by the at least one processor, cause the terminal to:
   execute a messenger application comprising a user interface screen associated with a first user of the terminal, wherein the messenger application is installed on the terminal for a messaging service;
   while the messenger application being executed and via the user interface screen, display a chatroom, of the messenger application, associated with at least one second user of at least one second terminal, wherein the chatroom of the messenger application comprises:
      a chat display window of the messaging service; and
      a user input interface configured to receive one or more user inputs associated with the chatroom, wherein:
         while the chat display window displays at least a portion of chat messages of the chatroom, the user input interface is configured to switch between a chat mode and an assistant mode,
         during the chat mode being executed, the user input interface is configured to receive a user input associated with the chat mode and associated with at least one additional chat communication for display in the chat display window, and during the assistant mode being executed, the user input interface is configured to provide access to at least one assistant mode;

determine a type of the chatroom of the messenger application, wherein the type of the chatroom indicates that the chatroom is an anonymous chatroom;

display an interfacing object, wherein the interfacing object indicates, based on the type of the chatroom, one or more available assistant functions and one or more unavailable assistant functions; and execute, based on a user input associated with the interfacing object, at least one of the one or more available assistant functions.

15. The terminal of claim 14, wherein the chat display window of the messaging service comprises at least one chat message communicated between the first user and the at least one second user, and wherein the instructions, when executed by the at least one processor, cause the terminal to determine, based on an identifier of the chatroom, the type of the chatroom.

16. The terminal of claim 14, wherein the instructions, when executed by the at least one processor, cause the terminal to determine the type of the chatroom further based on at least one of:

relationship information that is registered in the messenger application and indicates a relationship between the first user and the at least one second user;

an identifier of the at least one second user in the chatroom;

a number of the at least one second user in the chatroom; or a participation type associated with the chatroom.

17. The terminal of claim 14, wherein the chat display window of the messaging service comprises at least one chat message communicated between the first user and the at least one second user, wherein the instructions, when executed by the at least one processor, cause the terminal to convert, based on a selection of a mode conversion interfacing object and based on the type of the chatroom, an input mode of the user input interface to the assistant mode, and wherein the user input interface comprises the mode conversion interfacing object.

18. The terminal of claim 14, wherein the at least one of the one or more available assistant functions is associated with at least one user of the at least one second user.

19. The terminal of claim 14, wherein the instructions, when executed by the at least one processor, cause the terminal to:

while the messenger application being executed and via the user interface screen, display a second chatroom of the messenger application, wherein the second chatroom of the messenger application comprises:

a second chat display window of the messaging service; and a second user input interface configured to receive one or more user inputs associated with the second chatroom, wherein a type of the second chatroom is different from the type of the chatroom, wherein the second user input interface is linked to a second interfacing object configured to execute at least one second assistant user interface associated with the type of the second chatroom, and wherein the at least one second assistant user interface is configured to provide at least one of the one or more unavailable assistant functions.

20. The terminal of claim 19, wherein the instructions, when executed by the at least one processor, cause the terminal to customize the interfacing object based on at least one of:

information of one or more users of the second chatroom;

one or more chat messages displayed in the second chat display window; or one or more application programs associated with one or more users of the second chatroom.

\* \* \* \* \*